US012300193B2

(12) United States Patent
Chapiro et al.

(10) Patent No.: US 12,300,193 B2
(45) **Date of Patent: *May 13, 2025**

(54) LUMINANCE ADAPTION TO MINIMIZE DISCOMFORT AND IMPROVE VISIBILITY

(71) Applicant: Dolby Laboratories Licensing Corporation, San Francisco, CA (US)

(72) Inventors: Alexandre Chapiro, Sunnyvale, CA (US); Robin Atkins, San Jose, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/111,506

(22) Filed: Feb. 17, 2023

(65) Prior Publication Data

US 2023/0282183 A1 Sep. 7, 2023

Related U.S. Application Data

(63) Continuation of application No. 16/717,871, filed on Dec. 17, 2019, now Pat. No. 11,587,526.

(60) Provisional application No. 62/782,868, filed on Dec. 20, 2018.

(51) Int. Cl.

| | |
|---|---|
| ***H04N 21/485*** | (2011.01) |
| ***G09G 5/10*** | (2006.01) |

(52) U.S. Cl.

CPC ....... *G09G 5/10* (2013.01); *G09G 2320/0626* (2013.01); *G09G 2320/08* (2013.01)

(58) Field of Classification Search

None

See application file for complete search history.

(56) References Cited

U.S. PATENT DOCUMENTS

| | | | |
|---|---|---|---|
| 5,732,146 | A | 3/1998 | Yamada |
| 6,229,577 | B1 | 5/2001 | Barth |
| 9,083,948 | B2 | 7/2015 | Dane |
| 9,230,509 | B2 | 1/2016 | Van Der Vleuten |
| 9,685,120 | B2 | 6/2017 | Atkins |

(Continued)

FOREIGN PATENT DOCUMENTS

| | | | |
|---|---|---|---|
| CN | 102466887 | B | 12/2013 |
| CN | 106448615 | B | 7/2019 |

(Continued)

OTHER PUBLICATIONS

Cutting, et al Quicker, Faster, Darker: Changes in Hollywood film over 75 years, I-Perception, 2011.

(Continued)

*Primary Examiner* — Krishna P Neupane

(57) ABSTRACT

One or more media contents are received. A viewer's light adaptive states are predicted as a function of time as if the viewer is watching display mapped images derived from the one or more media contents. The viewer's light adaptive states are used to detect an excessive change in luminance in a specific media content portion of the one or more media contents. The excessive change in luminance in the specific media content portion of the one or more media contents is caused to be reduced while the viewer is watching one or more corresponding display mapped images derived from the specific media content portion of the one or more media contents.

20 Claims, 6 Drawing Sheets

(56) References Cited

U.S. PATENT DOCUMENTS

| | | | | |
|---|---|---|---|---|
| 2008/0129875 | A1 | 6/2008 | Lei | |
| 2011/0175925 | A1* | 7/2011 | Kane | G01J 1/4204 345/589 |
| 2012/0105608 | A1 | 5/2012 | Ko | |
| 2017/0039919 | A1 | 2/2017 | Wu | |
| 2017/0155903 | A1 | 6/2017 | Rosewarne | |
| 2018/0218709 | A1* | 8/2018 | Aydin | G09G 5/005 |
| 2018/0249140 | A1 | 8/2018 | Sakurai | |
| 2019/0378253 | A1 | 12/2019 | Huang | |
| 2020/0098335 | A1* | 3/2020 | Chen | G09G 5/10 |

FOREIGN PATENT DOCUMENTS

| | | | |
|---|---|---|---|
| CN | 106030503 | B | 4/2020 |
| CN | 107925785 | B | 7/2020 |
| CN | 108053381 | B | 4/2022 |
| CN | 108376389 | B | 4/2022 |
| WO | 2015/130797 | | 9/2015 |
| WO | 2017/086950 | | 5/2017 |
| WO | 2017/089146 | | 6/2017 |

OTHER PUBLICATIONS

Ferwerda, et al "A Model of Visual Adaptation for Realistic Image Synthesis" SIGGRAPH 1996.

Templing, et al "Modeling and Optimizing Eye Vergence Response to Stereoscopic Cuts", SIGGRAPH 2014.

Zhu, Y. et al "Closing the Gap: Visual Quality Assessment Considering Viewing Conditions" IEEE Eight International Conference on Quality of Multimedia Experience, Jun. 6-8, 2016, Lisbon, Portugal.

* cited by examiner

LUMINANCE ADAPTION TO MINIMIZE DISCOMFORT AND IMPROVE VISIBILITY

CROSS REFERENCE TO RELATED APPLICATIONS

This application is a continuation of U.S. non provisional patent application Ser. No. 16/717,871 filed Dec. 17, 2019, which claims priority to United States Provisional Application No. 62/782,868, filed Dec. 20, 2018, which is incorporated by reference in its entirety herein.

TECHNOLOGY

The present invention relates generally to image production and consumption, and in particular, to luminance adaption to minimize discomfort and improve visibility.

BACKGROUND

In vision science, luminance adaptation is the human visual system's ability to adjust to various levels of luminance that can be perceived simultaneously. This adaptation can take a significant amount of time, up to 30 minutes for luminance changes from bright sunlight to deep darkness.

An example of luminance adaptation is a viewer (e.g., virtually, actually, etc.) entering a dark room from a brightly lit street, in which case the viewer's eyes have been adapted to the sunlight outside and the viewer is left somewhat blinded for a stretch of time from the entry of the dark room until the viewer's eyes adjust or adapt to various levels of luminance in the dark room. The reverse situation also triggers adaptation. Walking from a dark room onto a brightly lit street can be uncomfortable or even painful when the difference in luminance is significant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

Figure 1A:
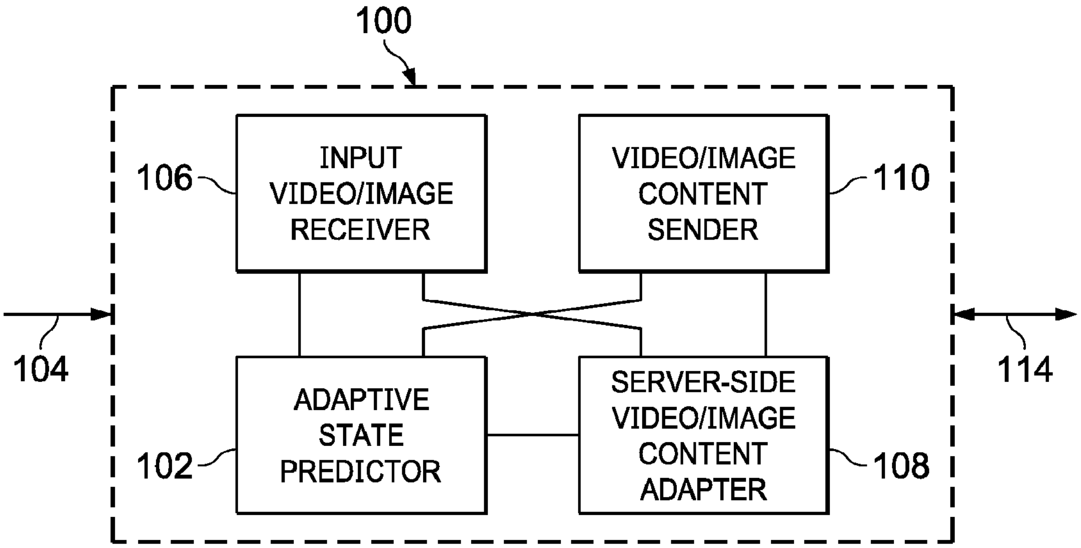
FIG. 1A illustrates an example video/image content production system.

Example embodiments, which relate to luminance adaption to minimize discomfort and improve visibility, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. SYSTEM OVERVIEW
3. LUMINANCE CHANGES IN VIDEO ASSETS
4. LIGHT LEVEL ADAPTATION
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Standard dynamic range (SDR) content has relatively limited luminance ranges, resulting in only relatively small light adaptive level changes for viewers consuming video assets. With the introduction of more and more high dynamic range (HDR) content for various home theater displays, cinemas, monitors, mobile devices, and others, relatively large light adaptive level changes (for visible luminance or visible light levels) for viewers may become much more common than before.

In particular, sudden and extreme changes in brightness (or light levels), such as occurring in or around video cuts in most professionally edited content, may become (e.g., visually, physiologically, etc.) uncomfortable for viewers. Given that modern studies and analyses have revealed the length of the average shot in professionally edited content trending towards a relatively short average time duration such as 3.5 seconds, viewers are expected to be less likely to be able to properly adapt to suddenly changed light levels in more upcoming HDR content. In addition, other common situations exist for extreme brightness changes, including but not limited to: changing channels while watching television, looking at a slideshow, browsing a photo library or presentation, navigating (e.g., graphic, tabular, textual, etc.) menus, watching loading screens that lead to media programs, and so forth.

Techniques as described herein can be used to mitigate sudden changes in brightness by modeling and tracking a human viewer's light adaption levels and by making adjustments to either video/image content with an upstream device (e.g., in content mastering process, in a production studio, in an upstream video authoring/encoding system, etc.) or display mapping of to-be-rendered video/image content with a downstream device (e.g., in a media client device, a handheld device, a playback device, a television, a set-top box, etc.). Additionally, optionally or alternatively, some or all of these adjustments can be triggered by channel switching in a television, advancing to another photographic picture in photo library browsing or slide presentation, receiving light level change indications from scene or frame luminance metadata, and so forth.

These techniques can be used to implement with a system that analyzes given video assets using a specific model of visual adaptation or a combination of a variety of models of visual adaptation (for the human visual system or HVS). Such models of visual adaptation may be used to take into account image/video characteristics such as the mean luminance, luminance distribution, regions of interest, surround luminance among others, as well as changes of any of the foregoing over time, as detected in the video assets and/or as perceived by a human viewer as represented by the model(s) of visual adaptation while consuming/viewing the video assets. The analysis of the video assets can be performed at a content mastering/production stage in a production studio (also including in a mobile truck video facility for live productions), at a content consumption stage while the given video assets are being presented to an end user viewer, or at both stages.

If a large luminance level change is detected in any section or time interval (e.g., during a video/scene cut (or transition), during a channel switching, during a change from one image or slide to next image or slide, etc.) covered by the given video assets, a system as described herein may alleviate or ameliorate a predicted discomfort using a number of light level adaptation tools as follows.

For example, the system can help content creators visualize a light level adaptation curve (e.g., of an average human viewer, of the HVS, etc.) over time so that informed decisions may be made by the content creators in performing luminance/color grading, etc.

The system can also help the content creators select or place video cuts (or transitions), image transitions, presentation slide changes, etc., in locations or orders in which discomfort due to light level adaptation is significantly reduced, alleviated or avoided.

The system can further help the content creators grade or cut to adjust video/image content in a way that allows viewers to see the video/image content as intended rather than being "blinded" during (light level) adaptation periods (or time periods in which the viewers' eyes are adapted from a first light adaptive level to a second different light adaptive level). Additionally, optionally or alternatively, suggestions of camera parameters, grading techniques, adaptations/adjustments/mapping operations of luminance levels represented in the video/image content, etc., can be presented to the content creators for review before actual implementation of any of these suggestions.

Techniques as described herein may be used to implement (e.g., automatically performed with little or no user interaction/input, automatically performed with user interaction/input, etc.) methods/algorithms to edit (e.g., input, intermediate, final, output, etc.) video/image content to ease any immediate and/or excessive impacts of significant luminance changes on the HVS (e.g., at a content production stage, at the client-side in real time or in near real time while the video/image content is being consumed, in part at the content production stage and in part at the content consumption stage, etc.). This may, but is not necessarily limited to only, be achieved by applying a tone mapping algorithm to preserve visual qualities of the video/image content while reducing the difference between the expected/predicted/determined light level adaptive states of the HVS or an actual viewer.

Example benefits provided by techniques as described herein include, but are not necessarily limited to only, providing a solution to luminance adaptation problems that become more relevant and urgent over time as high dynamic range technologies (e.g., 4000-nit or more video/image display devices, etc.) become more and more prevalent and powerful; providing a tool to content creators to generate video assets where cuts and transitions better fit the natural adaptation processes of the viewers' visual system; providing additional tools that can be developed to visualize adaptation mismatches, place cuts between contiguous shots in a manner conscious/informed of adaptation, optimize display parameters for adaptation matching automatically and predict cut or transition quality in terms of adaptive comfort and visibility of content; etc.

In some example embodiments, mechanisms as described herein form a part of a media processing system, including but not limited to any of: cloud-based server, mobile device, virtual reality system, augmented reality system, head up display device, head mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. System Overview

Figure 5:
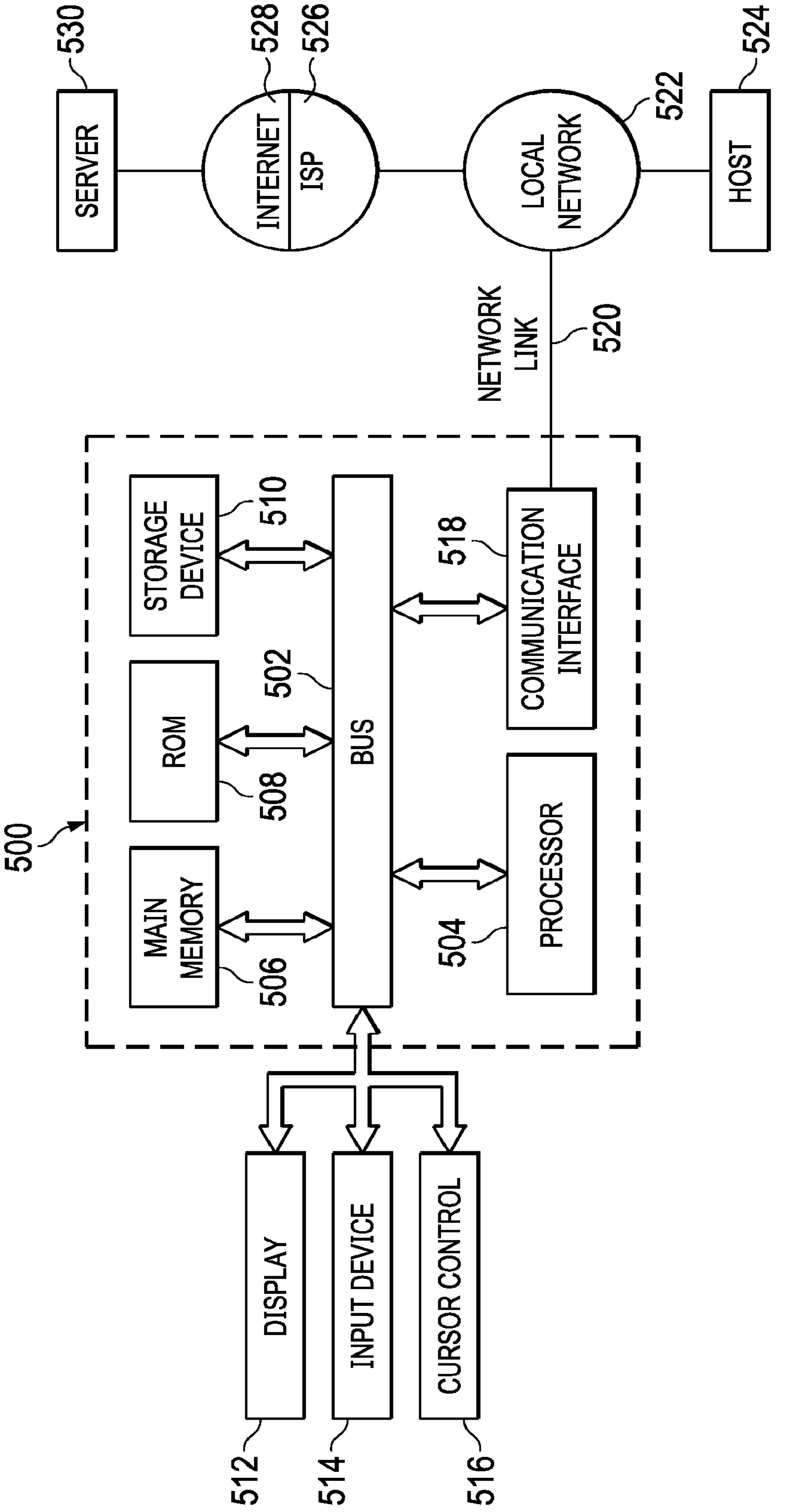
FIG. 5 illustrates an example hardware platform on which a computer or a computing device as described herein may be implemented.

FIG. 1A illustrates an example video/image content production system 100 that comprises an input video/image receiver 106, an adaptive state (or light adaptive level) predictor 102, a server-side video/image content adaptor 108, a video/image content sender 110, etc. Some or all of the components of the video/image content production system (100) may be implemented by one or more devices (e.g., one or more computing devices as illustrated in FIG. 5, etc.), modules, units, etc., in software, hardware, a combination of software and hardware, etc. The video/image content production system (100) may be a part of a color grading/timing platform or system including but not limited to be a color grading workstation operated by a colorist, a video professional, a director, a video artist, etc.

In some embodiments, the input video/image receiver (106) comprises software, hardware, a combination of software and hardware, etc., to receive input video/image content 104 from a video/image source. Example video/image sources as described herein may include, but are not necessarily limited to only, one or more of: local video/image data repositories, video streaming sources, non-transitory storage media storing video/image contents, cloud-based video/image sources, image acquisition devices, camera systems, etc.

In some embodiments, the adaptive state predictor (102) comprises software, hardware, a combination of software and hardware, etc., to analyze luminance levels and variations thereof over time, as represented by pixel values (represented in transform or non-transform domains) of the received input video/image content (104).

A wide variety of video/image display devices may be used to display the same video asset (e.g., a movie, a media program, a photo library, a slide presentation, an image collection, etc.). As used herein, a video asset may refer to a (e.g., source, etc.) media content item that serves as a direct or indirect source from which one or more different versions, releases, grades, and so forth, of the media content item can be generated under techniques as described herein.

Different video/image display devices may support different dynamic ranges (or ranges of luminance levels), each of which may be characterized as a luminance range between the brightest level and the darkest level. Some high-end video/image display devices support a peak luminance of 4000 nits or even more. For example, at CES 2018, Sony demonstrated a Tv display that achieved 10,000 nits. Some less capable video/image display devices support a peak luminance of around 100 nits (e.g., a standard dynamic range, etc.). Some video/image display devices support a large display screen size. Some other video/image display devices support a relatively small display screen size (e.g., as viewed at normal viewing distances for such other video/image display devices, etc.). Some video/image display devices operate in video/image rendering environments (e.g., a dedicated home entertainment room, a cinema, etc.) with a low ambient light. Some other video/image display devices operate in video/image rendering environments (e.g., outdoors, bright rooms or offices, etc.) with relatively bright ambient levels.

In some embodiments, the video/image content production system (100), or the adaptive state predictor (102) therein, may determine display capabilities and conditions of one or more target video/image content display devices for which the input video/image content (104) are to be adapted. Example display capabilities and conditions may include, but are not necessarily limited to only, some or all of: peak luminances, luminance dynamic ranges, screen sizes, default, predicted or measured ambient light levels in video/content rendering environments, etc.

In some embodiments, determining the display capabilities and conditions is based at least in part on configuration information (e.g., locally or remotely accessible to the video/image content production system (100), etc.) for one or more downstream video/image content consumption systems operating with the target video/image content display devices.

In some embodiments, determining the display capabilities and conditions is based at least in part on information received over a bidirectional data flow 114 from one or more downstream video/image content consumption systems operating with the target video/image content display devices.

In some embodiments, average, maximum and minimum luminances in the dynamic range in the input video/image content may be determined based on (e.g., all, etc.) luminance levels represented by the pixel values of the input video/image content as would be rendered in the entire screen of a specific target video/content display device.

In some operational scenarios, a downstream recipient device sends, to the video/image content production system (100) via the data flow (114) in real time or in near real time, view direction tracking data that indicates the viewer's view directions while the viewer is (or predicted to be) consuming or watching the video/image content sent by the video/image content production system (100) to the downstream recipient device.

In some embodiments, the adaptive state predictor (102) receives or accesses the view direction data and uses the viewing tracking data to (help) determine average, maximum and minimum luminances based on luminance levels of pixels represented over time in the viewer's foveal vision or enlarged vision that includes the viewer's foveal vision plus a safety zone around the viewer's foveal vision, rather than based on luminance levels of pixels represented over time in the entire screen of a video/content display device.

The average, maximum and minimum luminances over time as determined by the adaptive state predictor (102)—through the luminance levels represented in an entire screen or a relatively small region (of interest) predicted/tracked to be watched by the viewer—may then be used to (help) determine the viewer's light level adaptive state at any given time, and to temporally track the adaptive state of the HVS or an actual viewer that is operating a downstream recipient device to which the video/image content production system (100) sends the video/image content for rendering. In addition, some eye tracker technology also has the ability to measure the viewer's pupil sizes, which are a component of light adaptation, as well as a possible indicator of discomfort due to high luminance. For example, when the pupil initially becomes fully constricted, there is no more opportunities to reduce the light on the retina. In such cases, the reflexes of averting the head, raising the hand to black the light, and closing of the eyes occur. Thus the pupil size can be used as input to the estimation of temporal changes of light adaptation and possible discomfort.

The results of luminance level analyses with respect to the video/image content rendered to the viewer may be used by the video/image content production system (100), or the adaptive state predictor (102) therein, to determine or identify scene cuts (e.g., a scene of 3.5 seconds, a scene of 4 seconds, a scene of 2 seconds, etc.) such as transitions from previous scenes to immediately subsequent scenes; to determine whether there is a change in the video/image content rendered to the viewer from bright to dark, from dark to bright, from previous light levels to comparable later light levels, etc.; to determine whether there is an excessive change in luminance level, a moderate change in luminance level, a relatively small change in luminance level, a steady state in luminance level, etc., in the video/image content rendered to the viewer; to determine, based on a model of (HVS) light level adaptive state, whether any of these changes is likely to exceed visible light level range the HVS or the viewer is capable of adapting to; to determine whether there exist uncomfortable flashes (e.g., excessive/uncomfortable changes in luminance level, etc.) or repetitive flashing; etc.

Results (including but not limited to the HVS light level adaptive state) of the luminance level analysis of the video/image content rendered to the viewer may be specific to each of the one or more target video/image content display devices. For example, first results of the luminance level analysis of the video/image content rendered to the viewer determined or generated for a first target video/image content display device among the one or more target video/image content display devices may be different from second results of the luminance level analysis of the video/image content rendered to the viewer determined or generated for a second target video/image content display device among the one or more target video/image content display devices. The HVS of a first viewer for the first target video/image content display device (e.g., a high-end TV, etc.) with a high dynamic range, a large screen size, a relatively dark video/image rendering environment, etc., may be predicted to encounter more uncomfortable flashes or excessive changes in luminance level, whereas the HVS off a second viewer for the second target video/image content display device (e.g., a mobile device, etc.) with a relatively narrow dynamic range, a small screen size, a relatively bright video/image rendering environment, etc., may be predicted to encounter fewer uncomfortable flashes or excessive changes in luminance level.

The video/image content production system (100), or the adaptive state predictor (102) therein, may generate image metadata specifying a measure (or measurements) of average luminance (and/or maximum or minimum luminance) of a scene, an image, a slide presentation, etc. Additionally, optionally or alternatively, the video/image content production system (100), or the adaptive state predictor (102) therein, may generate image metadata specifying the HVS or a viewer's light level adaptive state over time. Some or all of the image metadata may be specific to a specific (type of) target video/image content display device to which the input video/image content or an adapted version thereof is to be sent for rendering.

The image metadata may be signaled in advance and used by the server-side video/image content adaptor (108) or a downstream recipient device to determine any presence of one or more specific video/image content portions (e.g., specific scenes, specific scene cuts, specific images, specific image transitions, specific slide presentations, specific slide presentation transitions, etc.) that are to be adapted/mapped before the one or more specific video/image content portions are actually processed, sent and/or rendered to the viewer. As a result, the video/image content can be processed immediately or promptly by the server-side video/image content adaptor (108) or the downstream recipient device without introducing any frame delay type of visual artifacts due to adapting/mapping the video/image content.

In some embodiments, the server-side video/image content adaptor (108) comprises software, hardware, a combination of software and hardware, etc., to adapt the received input video/image content (104) into mapped/adjusted video/image content.

The video/image content production system (100), or the server-side video/image content adaptor (108) therein, may perform temporal content mapping/adjustment operations on the received input video/image content to generate the adapted video/image content that is sent by the video/image content production system (100) to the one or more downstream recipient devices. Additionally, optionally or alternatively, the video/image content production system (100), or the server-side video/image content adaptor (108) therein, may also perform tone mapping to address large luminance changes detected in the input video/image content.

Generating the adapted video/image content may include generating one or more device-specific versions, grades, releases, etc., from the input video/image content (104), respectively for the one or more target video/image content display devices to which the adapted video/image content is to be rendered.

In the adapted video/image content, excessive changes (which may be specific to a target video/image content display device) in luminance that are predicted to cause discomfort (e.g., exceeding a high luminance level change threshold, etc.) may be removed or reduced into non-excessive changes (e.g., moderated changes, etc., in luminance. The server-side video/image content adaptor (108) may adjust time durations/lengths used in achieving temporal adjustments of excessive changes in luminance. For example, the time durations/lengths of time for the temporal adjustments may be set depending on whether the luminance level is going from relatively bright to dark or relatively dark to bright. As the HVS takes relatively long time in adapting from bright to dark, a time duration/length for a corresponding temporal adjustment for an excessive change in luminance that represents a transition from bright to dark may be set to a relatively large value. Conversely, as the HVS takes relatively short time in adapting from dark to bright, a time duration/length for a corresponding temporal adjustment for an excessive change in luminance that represents a transition from dark to bright may be set to a relatively small value.

In some operational scenarios, the video/image content production system (100) sends, to the one or more downstream recipient devices, the input video/image content (or a derived version thereof) that has not already been adapted/mapped for the one or more target video/image content display devices to remove excessive changes in luminance levels. Some or all of the one or more downstream recipient devices can perform temporal filtering to remove some or all of the excessive changes, for example at the content consumption stage.

In some operational scenarios, the video/image content production system (100) sends, to the one or more downstream recipient devices, the video/image content that has already been adapted/mapped for the one or more target video/image content display devices to remove excessive changes in luminance levels. The video/image content production system (100), or the server-side video/image content adaptor (108), therein, may employ temporal filters to remove or reduce the excessive changes in luminance levels and generates server-side adapted/mapped video/image content from the input video/image content (104). The server-side adapted/mapped video/image content can then be sent by the video/image content production system (100) to the one or more downstream recipient devices.

The temporal filters employed by the video/image content production system (100) (or a downstream device) may be triggered by predefined events such as picture/slideshow advancement, excessive changes in luminance as indicated by the results of luminance level analyses of the input video/image content (104), etc.

The video/image content production system (100) may adjust time durations/lengths for applying temporal filters triggered by the predefined events. For example, a time duration/length for applying a temporal filter to a corresponding light adaptive level transition in a predefined event may be set depending on whether the light adaptive level transition is going from relatively bright to dark or relatively dark to bright. The time duration/length from bright to dark may be set to a relatively large value. The time duration/length from dark to bright may be set to a relatively small value.

Figure 1B:
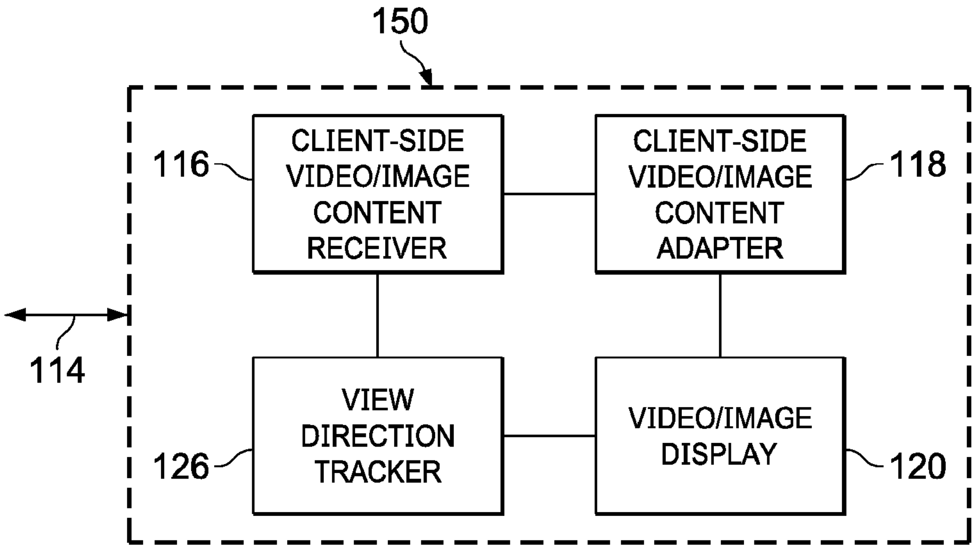
FIG. 1B illustrates an example video/image content consumption system.

In some embodiments, the video/image content sender (110) comprises software, hardware, a combination of software and hardware, etc., to send the received input video/image content (104) or the mapped/adjusted video/image content in a unidirectional data flow or a bidirectional data flow 114 to one or more downstream recipient devices (e.g., a video/image content consumption system 150 of FIG. 1B, etc.).

The video/image content production system (100) may be used to support one or more of: real time video/image display applications or non-real-time video/image display applications. Example video/image display applications may include, but are not necessarily limited to only, any of: immersive video applications, non-immersive video applications, TV display applications, home theater display applications, cinema applications, mobile display applications, virtual reality (VR) applications, augmented reality (AR) applications, automobile entertainment applications, helmet mounted display applications, heads up display applications, games, 2D display applications, 3D display applications, multi-view display applications, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the video/image content production system (100).

FIG. 1B illustrates an example video/image content consumption system 150 that comprises a client-side video/image content receiver 116, a view direction tracker 126, a client-side video/image content adaptor 118, a video/image display device 120, etc. Some or all of the components of the video/image content consumption system (150) may be implemented by one or more devices, modules, units, etc., in software, hardware, a combination of software and hardware, etc.

In some embodiments, the client-side video/image receiver (116) comprises software, hardware, a combination of software and hardware, etc., to receive video/image content from an upstream device or a video/image content source.

In some operational scenarios, the client-side video/image receiver (116) sends, via a bidirectional data flow (e.g., 114, etc.), the viewer's view direction tracking data, which can be used by a video/image content production system (e.g., 100 of FIG. 1A, etc.) to establish or determine the viewer's view directions over time in relation to a spatial coordinate system in which the video image content is to be rendered in the viewer's video/image display device (120).

The viewer may move or change the viewer's view directions at runtime. In some embodiments, the view direction tracker (126) comprises software, hardware, a combination of software and hardware, etc., to generate view direction data related to the viewer over time. The view direction tracking data may be sampled or measured at a relatively fine time scale (e.g., every millisecond, every five milliseconds, etc.). The view direction tracking data may be used to establish/determine the viewer's view directions at a given time resolution (e.g., every millisecond, every five milliseconds, etc.). Since many eye tracker/gaze tracker/view direction trackers are based on camera imagery of the eyes, they can also measure the pupil diameter. This can also be used as mentioned previously.

In some embodiments, the video/image content consumption system (150) determines the screen size of the video/image content display device (120), an ambient light level of a video/image content rendering environment in which the video/image content display device (120) operates. In some embodiments, the video/image content consumption system (150) monitors user activities, device control activities to determine in real time or in near real time pre-defined events such as channel switching, menu loading, camera switching, live scene switching, slide presentation transitions, image transitions in browsing a photo/image library, etc. Additionally, optionally or alternatively, the video/image content consumption system (150) may determine some or all of the foregoing based on the received image metadata.

In some embodiments, the client-side video/image content adaptor (118) comprises software, hardware, a combination of software and hardware, etc., to map the received video/image content (114) into display mapped video/image content; output the display mapped video/image content (e.g., in an HDMI signal, etc.) to the video/image display device (120) for rendering; etc.

In some operational scenario in which the video/image content consumption system (150) receives the video/image content that has already been adapted/mapped for the video/image content display device (120) to remove excessive changes in luminance levels, the video/image content consumption system (150) can directly render the already adapted/mapped video/image content as received with the video/image content display device (120).

In some operational scenario in which the video/image content consumption system (150) receives the video/image content that has not already been adapted/mapped for the video/image content display device (120) to remove excessive changes in luminance levels, the client-side video/image content adaptor (118) employs temporal filters to remove or reduce the excessive changes in luminance levels and generates client-side adapted/mapped video/image content from the received video/image content via the data flow (114). The client-side adapted/mapped video/image content can then be display mapped and/or rendered with the video/image content display device (120).

In some embodiments, the temporal filters employed by the video/image content consumption system (150) may be triggered by predefined events such as television channel switching, picture/slideshow advancement, excessive changes in luminance as indicated by the image metadata received with the video/image content, excessive changes in luminance as determined by results of client-side luminance level analyses performed by the video/image content consumption system (150), etc.

In some embodiments, the video/image content consumption system (150), or the client-side video/image content adaptor (118) therein, determines the average, maximum and minimum luminances over time—through the luminance levels represented in an entire screen or a relatively small region (of interest) predicted/tracked to be watched by the viewer—may then be used to (help) determine the viewer's light level adaptive state at any given time, and to temporally tracks the adaptive state of the HVS or an actual viewer to which the video/image content consumption system (150) renders the video/image content with the video/image content display device (120).

The results of luminance level analyses with respect to the video/image content rendered to the viewer may be used by the video/image content consumption system (150), or the client-side video/image content adaptor (118) therein, to determine or identify scene cuts (e.g., a scene of 3.5 seconds, a scene of 4 seconds, a scene of 2 seconds, etc.); to determine whether there is a change in the video/image content rendered to the viewer from bright to dark, from dark to bright, from previous light levels to comparable later light levels, etc.; to determine whether there is an excessive change in luminance level, a moderate change in luminance level, a relatively small change in luminance level, a steady state in luminance level, etc., in the video/image content rendered to the viewer; to determine, based on a model of (HVS) light level adaptive state, whether any of these changes is likely to exceed visible light level range the HVS or the viewer is capable of adapting to; to determine whether there exists uncomfortable flashes (e.g., excessive/uncomfortable change in luminance level, etc.); etc.

The video/image content consumption system (150) may adjust time durations/lengths of temporal filters triggered by the predefined events. For example, a time duration/length for applying a temporal filter to a predefined event may be set depending on whether the to-be-adapted luminance level is going from relatively bright to dark or relatively dark to bright in the predefined event. The time duration/length from bright to dark may be set to a relatively large value. The time duration/length from dark to bright may be set to a relatively small value.

Additionally, optionally, or alternatively, some or all of image rendering operations such as view direction tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the video/image content consumption system (150).

The video/image content consumption system (150) may be used to support one or more of: real time video/image display applications or non-real-time video/image display applications. Example video/image display applications may include, but are not necessarily limited to only, any of: immersive video applications, non-immersive video applications, TV display applications, home theater display applications, cinema applications, mobile display applications, virtual reality (VR) applications, augmented reality (AR) applications, automobile entertainment applications, helmet mounted display applications, heads up display applications, games, 2D display applications, 3D display applications, multi-view display applications, etc.

Techniques as described herein can be implemented in a variety of system architectures. Some or all image processing operations as described herein can be implemented by one or more of cloud-based video/image content production systems/servers, video/image content production systems/servers collocated with or incorporated into video streaming clients, image rendering systems, image rendering systems, display devices, etc. Based on one or more factors such as types of video applications, bandwidth/bitrate budgets, computing capabilities, resources, loads, etc., of recipient devices, computing capabilities, resources, loads, etc., of video/image content systems/servers and/or computer networks, etc., some image processing operations can be performed by a video/image content production system/server, while some other image processing operations can be performed by a video/image content rendering system, a video streaming client, an image rendering system, a display device, etc.

Luminance level adaptation of video/image content as described herein can be performed at scene cuts (or transitions), image transitions, slide presentation transitions, etc., as well as channel changes, unplanned situations such as changing channels while watching television, looking at a slideshow, photo library or presentation, (e.g., graphic, tabular, textual, etc.) menus and loading screens leading to media programs, live scenes and transitions thereof, etc.

Temporal filtering of excessive changes in luminance levels can be (e.g., automatically, programmatically, with little or no user interaction, with user interaction/input, etc.) performed by a video/image content production system, a video/image content consumption system, or both. By way of example but not limitation, excessive changes in luminance levels at scene cuts (or transitions)—which may or may not involve live scenes and transitions thereof—may be temporally filtered by a video/image content production system, whereas excessive changes in luminance levels in other situations (including but not necessarily limited to only transitions of live scenes in real time) may be left to be performed by a video/image content consumption system.

Temporal filters as described herein may be applied (e.g., by a video/image content production system, by a video/image content consumption system, etc.) to remove certain types of excessive changes in luminance levels but not to remove other types of excessive changes in luminance levels. For example, within a movie or a media program, excessive changes in luminance level may be unaffected or affected to a less extent by temporal filtering as described herein to preserve artistic intent. In comparison, in channel switching, menu loading, commercials, etc., excessive changes in luminance level may be more aggressively removed/reduced or removed/reduced to a much greater extent by temporal filtering as described herein. Another way to achieve the temporal filtering can be used when a display mapping algorithm based on source metadata and display parameters is used. In these cases, the display's capability is conveyed by parameters such as max luminance, and min luminance. These parameters are usually fixed (in dolby Vision, they are called Tmin, and Tmax, where T stands for target, which refers to the display), and the display mapping algorithm maps the source data into the display's range. One way to lower the displayed luminance is to simply change the Tmax parameter in the mapping algorithm, in particular, by lowering it. So rather than temporally filter the frames of the video to decrease the magnitude differences across a scene, it can be achieved by simply modifying the display parameters as used in the display mapping algorithm n a gradual manner. The gradation of the changes would be based on the intended temporal filtering parameters. In some implementations, this method is more cost effective than performing the temporal filtering on all of the pixels for every frame involved in the compensation.

Techniques as described herein can be implemented to predict the viewer's light adaptive level/state (or a light level/state to which the viewer is predicted to be adapted) and emulate the natural vision process in the process of rendering display mapped video/image content. Image metadata and/or luminance level analyses as described herein can be used to specify or influence how the viewer's light adaptive level/states vary, transition or adapt over time at various time points.

A light adaptive level/state model may be used by a video/image content production system, a video/image content consumption system, etc., to predict or estimate how the viewer's eyes are to adapt to different luminance levels over time. In some embodiments, the light adaptive level/state model may be dependent on a number of light adaptation factors or input variables including but not limited to one or more of: a light level of a first region to which the viewer has been viewing, a light level of a second region to which the viewer is predicted or determined to be directed to, a length of time during which the viewer's focal vision is within the first region, a length of time during which the viewer's focal vision is within the second region, etc.

The light adaptive level/state model may comprise, incorporate, and/or depend on, input factors that take into account differences in target displays devices. For example, the light adaptive level/state model may predict different light adaptive levels/states differently for different types of target display devices with different display capabilities.

The light adaptive level/state model may comprise, incorporate, and/or depend on, input factors that take into account differences in video/image content rendering environments. For example, the light adaptive level/state model may predict different light adaptive levels/states differently for different video/image content rendering environments with different ambient light levels.

The light adaptive level/state model as described herein may predict the HVS or the viewer's light adaptive levels/states differently for scenes of different image contexts. Example image contexts in scenes may include, without limitation, presence or absence of faces (e.g., as detected based on image analyses, etc.), presence or absence of motions, scenes of relatively large depths, scenes of relatively small depths, or other scenes. In some embodiments, faces detected/tracked in video/image content may be signaled in image metadata, and/or given a relatively steady luminance level in adapted/mapped video/image content.

The light adaptive level/state model as described herein may predict the HVS or the viewer's light adaptive levels/states based at least in part on track temporally what (or where in images) the viewer's eyes are seeing. Additionally, optionally or alternatively, luminance level adjustments may be made based at least in part on track temporally what (or where in images) the viewer's eyes are (or predicted to be) seeing.

Video/image content production system(s) as described herein may be used to generate multiple versions (e.g., releases, grades, etc.) from the same video asset for multiple different video/image content display device types. The multiple versions may include, but are not necessarily limited to only, any of: one or more SDR versions, one or more HDR versions, one or more cinema versions, one or more mobile device versions, etc. For example, there are HDR-capable TVs that take SDR input signals and upconvert them to HDR in an automatic and approximate manner. Such automatic upconversion may cause unformattable and/or uncomfortable light adaptive transitions when the display max luminance is very high. Some or all techniques as described herein can be implemented, used and/or performed in such TVs to regulate the SDR to HDR upconversion process to reduce such transitions.

These different versions of the same video asset may be generated, adapted, and/or derived based at least in part on a number of luminance level adaptation factors. Example luminance level adaptation factors may include, but are not necessarily limited to only, any of: respective predictions of the HVS's light adaptive levels/states over time as estimated/predicted while watching these different versions of the same video asset; sizes of screens of target display devices, etc. Some or all of these luminance level adaptation factors may be used to determine different values for thresholds (e.g., a high luminance change threshold, a moderate luminance change threshold, a low luminance change threshold, etc.) used to determine or identify different types of luminance level changes represented in video/image content of the video asset. In an example, in a cinema version, a specific set of thresholds may be used to preserve artistic intent as much as possible as compared with a source version of the video asset from which the different versions of the same video asset are directly or indirectly generated. In another example, excessive changes determined for HDR display devices may be determined for mobile phones as moderate changes, as the mobile phones operate with relatively small screens in video/image content rendering environments with relatively high ambient light levels. Empirical studies may be incorporated to determine default or pre-defined values for the thresholds used to determine or identify different types of luminance level changes represented in video/image content of the video asset. Additionally, optionally or alternatively, users such as colorists and/or video/image production professionals may interact with video/image content production system(s) to set or adjust the thresholds and other operational parameters used to adapt/map video/image content as described herein. In some embodiments, if artistic intent is to be faithfully preserved (e.g., as determined by a colorist, etc.), changes in luminance levels may not be adjusted or mapped. In some embodiments, image metadata received with input video/image content may be used to predict a viewer's light adaptive level/state or any discomfort that is likely to occur. In some embodiments, changes in brightness/luminance and/or the viewer's light adaptive levels/states over time may be determined or estimated through image metadata or analysis/estimation in real time or in near real time. In some embodiments, regions of interest (e.g., faces, movements, etc.) over time may be identified in input video/image content and used to determine changes in brightness/luminance and/or the viewer's light adaptive levels/states. In some embodiments, the changes in brightness/luminance and/or the viewer's light adaptive levels/states can be presented to a colorist in display page(s). Additionally, optionally or alternatively, safe regions or locations for selecting/specifying/implementing scene cuts (or transitions), image transitions, slide presentation transitions, etc., may be indicated to the colorist and help the colorist carry out actual scene cuts, actual luminance adjustments/adaptations, actual settings of time constants used in transitioning luminance levels from bright to dark, from dark to bright, and so forth. Additionally, optionally or alternatively, qualities (e.g., higher quality for lower likelihood of excessive change in luminance, lower quality for higher likelihood of excessive change in luminance, etc.) of safe regions or locations for selecting/specifying/implementing scene cuts (or transitions), image transitions, slide presentation transitions, etc., may be indicated to the colorist and help the colorist carry out actual scene cuts, actual luminance adjustments/adaptations, actual settings of time constants used in transitioning luminance levels from bright to dark, from dark to bright, and so forth.

Any combination in a variety of temporal luminance adjustment methods/algorithms may be used to adapt or transition input video/image content into adapted/mapped video/image content. In an example, when an excessive change in luminance is detected, the excessive change may be reduced by a specific ratio (e.g., a specific scaling factor, a specific scaling function, etc.) such as one half to generate or produce a less excessive change. In another example, when a moderate change in luminance is detected, the moderate change may be preserved, or may be reduced by a less extent. Different time constant may be used to effectuate luminance adaptation. For example, for bright-to-dark changes, a first time constant may be used to effectuate, implement or transition the changes in luminance over a first time interval corresponding to the first time constant. In comparison, for dark-to-bright changes, a second time constant (different from the first time constant) may be used to effectuate, implement or transition the changes in luminance over a second time interval corresponding to the second different time constant. Thus, different formulas, functions, algorithms, operational parameters, time constants/intervals, and/or reduction/expansion amounts, may be used to effectuate, implement or transition the changes in luminance as described herein.

Additionally, optionally or alternatively, luminance bins each of which comprises a count of pixels in a respective luminance subrange as derived from video/image content may be calculated, signaled, and/or used to determine or select a specific formula, function, algorithm, specific operational parameters, specific time constants/intervals, and/or specific reduction/expansion amounts, to effectuate, implement or transition the changes in luminance as described herein.

Additionally, optionally or alternatively, temporal/spatial frequencies as calculated, determined, and/or directly or indirectly derived, from video/image content may be used to determine or select a specific formula, function, algorithm and/or specific operational parameters, specific time constants/intervals, and/or specific reduction/expansion amounts, to effectuate, implement or transition the changes in luminance as described herein.

3. Luminance Changes in Video Assets

Figure 2A:
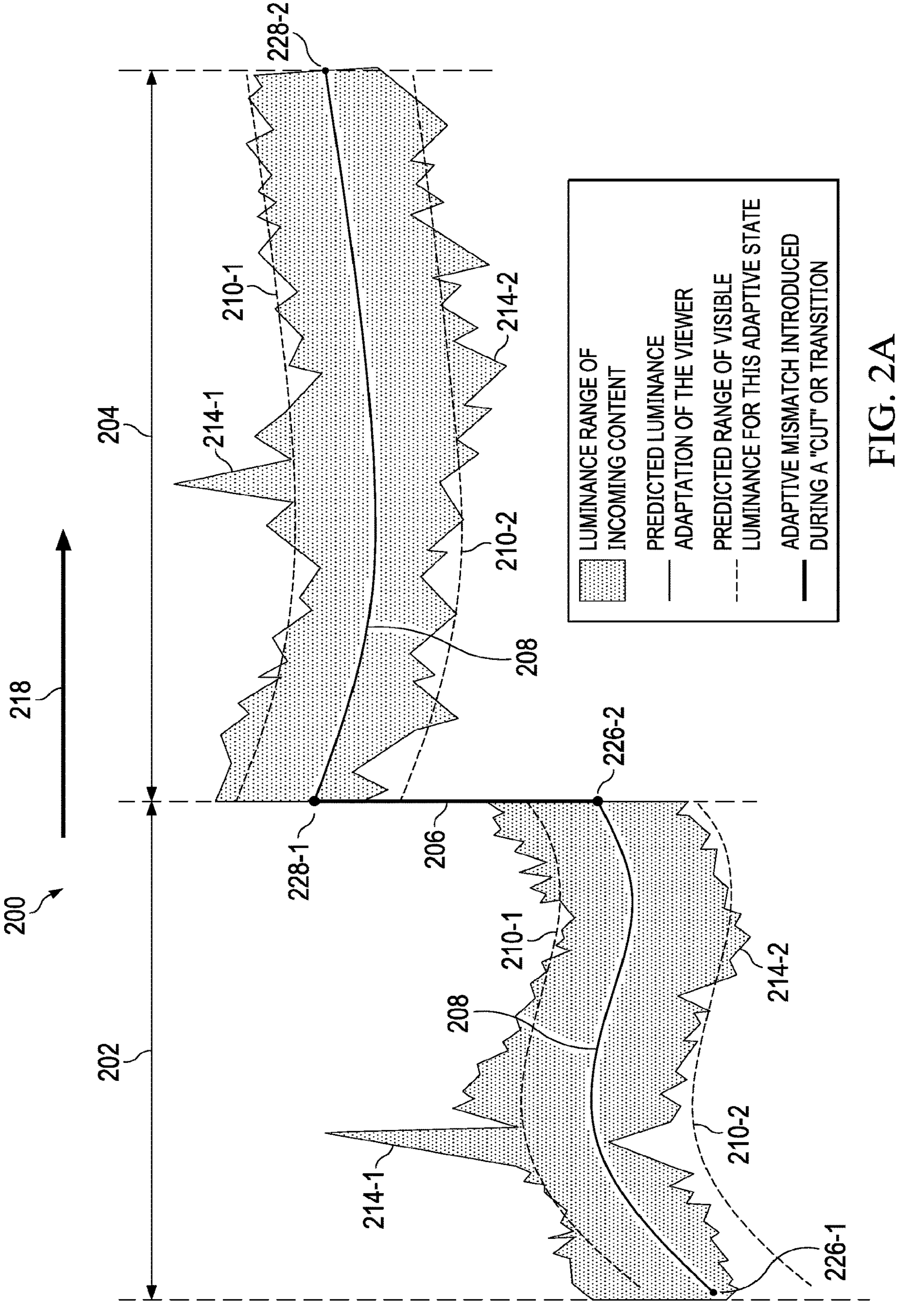
FIG. 2A illustrates an example visualization of a luminance range of input (or incoming) video/image content.

FIG. 2A illustrates an example visualization 200 of a luminance range of input (or incoming) video/image content (denoted as "Luminance range of incoming content") over time (e.g., along a time direction 218, etc.), a viewer's light adaption level/state 208 (denoted as "Predicted luminance adaptation of the viewer" or "this adaptive state") over time, the viewer's predicted visible luminance range (denoted as "Predicted range of visible luminance for this adaptive state") over time, etc.

Some or all elements in the visualization (200) may be presented in a GUI display page to a content creator that is mastering releasable video/image content at a video/image content production stage based on the input video/image content.

The luminance range of the input video/image content over time is delimited by a maximum luminance 214-1 and a minimum luminance 214-2, both of which may vary over time. One or both of the maximum luminance (214-1) and the minimum luminance (214-2) may be determined based on received image metadata and/or based on results of image analysis on pixel values in the input video/image content.

The viewer's light adaption level/state (208) over time may be determined/predicted based on received image metadata, and/or based on results of image analysis on pixel values in the input video/image content, and/or based at least in part on a light adaptive level/state model.

The viewer's predicted visible luminance range over time is delimited by a predicted maximum visible luminance 210-1 (dashed line in the figure) and a predicted minimum visible luminance 210-2, both of which may vary over time. One or both of the predicted maximum visible luminance (210-1) and the predicted minimum visible luminance (210-2) may be determined based on received image metadata, and/or based on results of image analysis on pixel values in the input video/image content, and/or the viewer's light adaption level/state (208) over time, and/or based at least in part on the light adaptive level/state model.

The viewer's predicted visible luminance range (e.g., as represented by the predicted maximum visible luminance (210-1) and the predicted minimum visible luminance (210-2), etc.) may be dependent on the viewer's (e.g., current, predicted, past, etc.) light adaption level/state (208).

A system as described herein can detect or predict one or more large luminance changes (denoted as "Adaptive mismatch introduced during a 'cut' or transition") such as 206 of FIG. 2A—in the input video/image content—that exceed the viewer's predicted visible luminance range (e.g., as represented by the predicted maximum visible luminance (210-1) and the predicted minimum visible luminance (210-2), etc.) at one or more time points. Some or all of these large luminance changes (e.g., 206, etc.) may represent adaptive mismatches as compared with (e.g., exceeding, etc.) the HVS's adaptive ability. These adaptive mismatches may include, but are not necessarily limited to only, those introduced during or by scene cuts (or transitions), image transitions, slide presentation changes, etc.

In some embodiments, the visualization (200) of the luminance range (e.g., as represented by the maximum luminance (214-1) and the minimum luminance (214-2), etc.) in the input video/image content and the viewer's light adaptive level/state (208) and predicted visible luminance range (e.g., as represented by the predicted maximum visible luminance (210-1) and the predicted minimum visible luminance (210-2), etc.) in dependence of the viewer's light adaptive level/state (208) can be used to inform (e.g., through green color coding, etc.) the content creator: which luminance level changes (or non-changes) of the input video/image content have no or little risk for exceeding the viewer's predicted visible luminance range (e.g., as represented by the predicted maximum visible luminance (210-1) and the predicted minimum visible luminance (210-2), etc.) at one or more time points or within one or more time intervals (e.g., a first time interval 202, a second time interval 204, etc.). The visualization (200) of the luminance range (e.g., as represented by the maximum luminance (214-1) and the minimum luminance (214-2), etc.) in the input video/image content and the viewer's light adaptive level/state (208) and predicted visible luminance range (e.g., as represented by the predicted maximum visible luminance (210-1) and the predicted minimum visible luminance (210-2), etc.) in dependence of the viewer's light adaptive level/state (208) can be used to inform (e.g., through yellow color coding, etc.) the content creator which luminance level changes of the input video/image content have elevated risks for (but not yet exceeding) exceeding the viewer's predicted visible luminance range at one or more time points or within one or more time intervals (e.g., the first time interval (202), the second time interval (204), etc.). The visualization (200) of the luminance range (e.g., as represented by the maximum luminance (214-1) and the minimum luminance (214-2), etc.) in the input video/image content and the viewer's light adaptive level/state (208) and predicted visible luminance range (e.g., as represented by the predicted maximum visible luminance (210-1) and the predicted minimum visible luminance (210-2), etc.) in dependence of the viewer's light adaptive level/state (208) can be used to inform (e.g., through yellow color coding, etc.) the content creator which luminance level changes of the input video/image content have excessive risks or likelihoods that exceed the viewer's predicted visible luminance range (e.g., as represented by the predicted maximum visible luminance (210-1) and the predicted minimum visible luminance (210-2), etc.) at one or more time points or within one or more time intervals (e.g., the first time interval (202), the second time interval (204), etc.).

In some embodiments, excessive (e.g., extreme, exceeding a high luminance level change threshold, etc.) luminance level changes (e.g., 206, etc.) in the input video/image content such as illustrated in FIG. 2A can be highlighted (e.g., in red color, a solid line, a thickened line, flashing, etc.) and brought to the content creator's attention. In some embodiments, some or all of these excessive luminance level changes (e.g., 206, etc.) in the input video/image content are automatically corrected (e.g., programmatically, with no or little user input/interaction, with user input/interaction, in software, in hardware, in a combination of software and hardware, etc.) in output video/image content that is produced/generated from the input video/image content, for example depending on which (or what) video/image display application is involved.

Figure 2B:
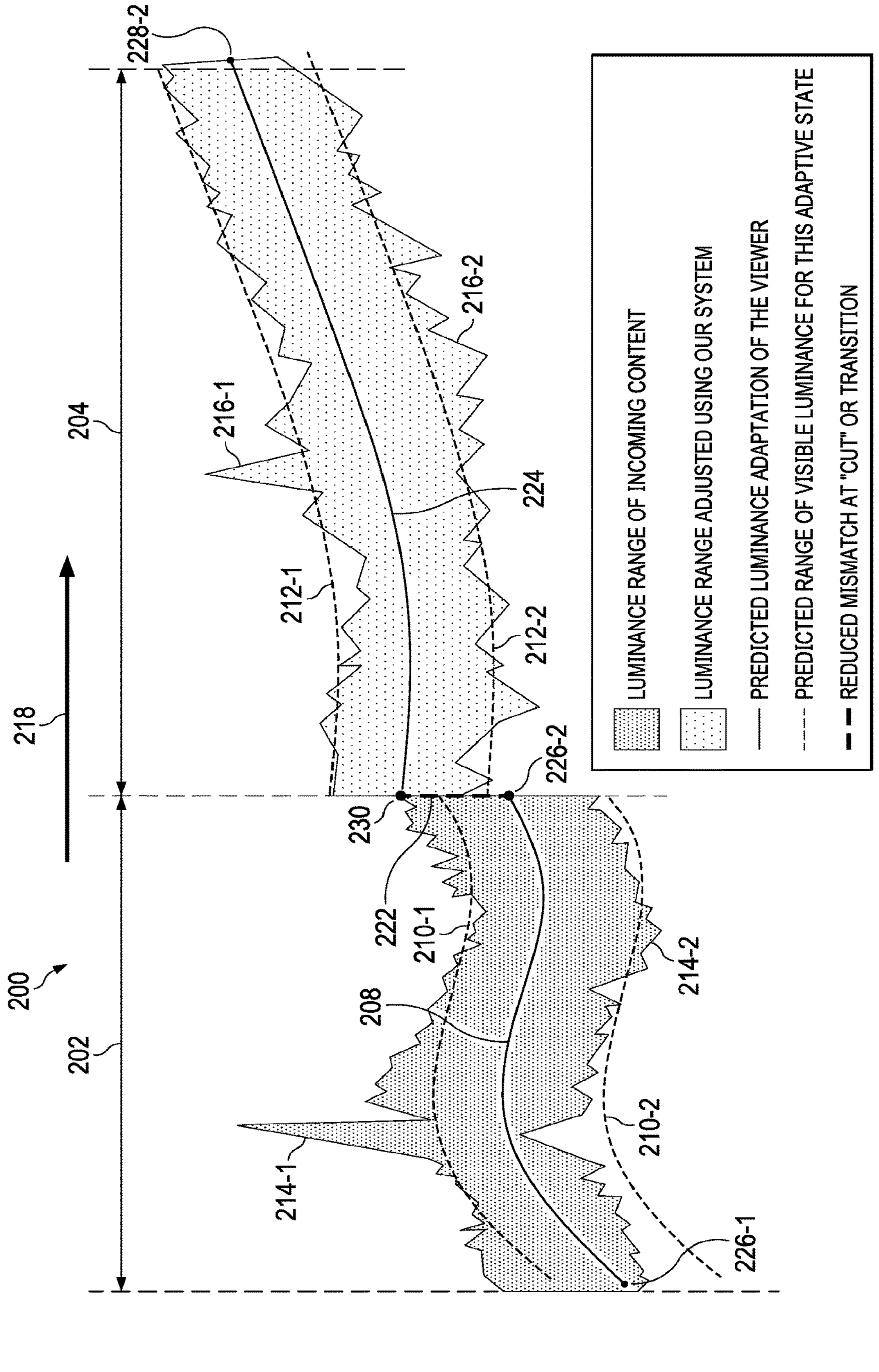
FIG. 2B illustrates an example visualization of a luminance range of output video/image content over time.

FIG. 2B illustrates an example visualization 250 of a luminance range of output video/image content over time, the viewer's light adaption level/state (denoted as "Predicted luminance adaptation of the viewer" or "this adaptive state") over time, the viewer's predicted visible luminance range (denoted as "Predicted range of visible luminance for this adaptive state") over time, etc.

The visualization may be presented in a GUI display page—which may be a different GUI display page from a display page displaying the visualization (200) as illustrated in FIG. 2A—to the content creator that is mastering the releasable video/image content at the video/image content production stage based on the input video/image content.

In some embodiments, excessive changes (e.g., exceeding the high luminance level change threshold, 206 of FIG. 2A, etc.) in luminance levels in the input video/image content (and/or any intermediate video/image content) may be mitigated over time (e.g., one or more contiguous and/or consecutive time intervals, etc.).

As illustrated in FIG. 2B, the output video/image content over time comprises the first time interval (202) in which the luminance range of output video/image content (denoted as "Luminance range of incoming content" in both FIG. 2A and FIG. 2B) is the same as the luminance range (e.g., as represented by the maximum luminance (214-1) and the minimum luminance (214-2) over the first time interval (202), etc.) of the corresponding input video/image content and a second time interval (204) in which the luminance range (e.g., as represented by an adjusted maximum luminance 216-1 and an adjusted minimum luminance 216-2 over the second time interval (204), etc.) of output video/image content (denoted as "Luminance range adjusted using our system" in both FIG. 2A and FIG. 2B) is different from the luminance range of the corresponding input video/image content.

The mapping of the input video/image content with the excessive changes (e.g., 206 of FIG. 2A, etc.) in luminance ranges to the output video/image content with moderated/mitigated/adapted changes (e.g., 222 of FIG. 2B, etc.) in luminance ranges as implemented and/or performed by a system as described herein reduces the excessive changes (e.g., 206, etc.), thereby minimizing/reducing (e.g., predicted, etc.) discomfort (which would be caused by viewing the input video/image content) due to a cut or transition in scenes or consecutive images. In some embodiments, the luminance range (e.g., as represented by the adjusted maximum luminance (216-1) and the adjusted minimum luminance (216-2) over the second time interval (204), etc.) of the adapted (or output) video/image content can be made to cause the viewer's adjusted light adaptive level/state (224) slowly return to an original light adaptive level/state (e.g., 228-2, etc.) while maintaining comfortable viewing conditions.

As can be seen in FIG. 2A, in the first time interval (202), the viewer's light adaptive level/state (208) for the input video/image content starts at a first original light adaptive level/state 226-1 and reaches a second original light adaptive level/state 226-2 at the end of the first time interval (202), which coincides or immediately precedes the beginning of the second time interval (204); in the second time interval (204), the viewer's light adaptive level/state (208) for the input video/image content starts at a third original light adaptive level/state 228-1 and reaches a fourth original light adaptive level/state 228-2 at the end of the second time interval (204).

As can be seen in FIG. 2B, in the first time interval (202), the output video/image content may be generated/derived from the input video/image content without adjusting the luminance range (e.g., as represented by the maximum luminance (214-1) and the minimum luminance (214-2) over the second time interval (204), etc.) of the output video/image content relative to the luminance range (e.g., as represented by the maximum luminance (214-1) and the minimum luminance (214-2) over the second time interval (204), etc.) of the input video/image content. As a result, for the output video/image content in the first time interval (202) as illustrated in FIG. 2B, the viewer's light adaptive level/state (208) for the input video/image content starts at the same first original light adaptive level/state (226-1) and reaches the same second original light adaptive level/state (226-2) at the end of the first time interval (202), as in the case of the input video/image content in the first time interval (202) as illustrated in FIG. 2A.

As illustrated in FIG. 2B, in the second time interval (204), the output video/image content may be generated/derived from the input video/image content with an adjustment/mapping of the luminance range (e.g., as represented by the maximum adjusted luminance (216-1) and the minimum adjusted luminance (216-2) over the second time interval (204), etc.) of the output video/image content, which is different from the luminance range (e.g., as represented by the maximum luminance (214-1) and the minimum luminance (214-2) over the second time interval (204), etc.) of the input video/image content for the same second time interval (204). As illustrated in FIG. 2B, in the second time interval (204), the viewer's adjusted light adaptive level/state (224) for the output video/image content starts at a mapped/adjusted light adaptive level/state 230 lower than the third original light adaptive level/state (228-1) of FIG. 2A for the input video/image content but closer to the second original light adaptive level/state (226-2) of FIG. 2A for the input video/image content. Likewise, in the second time interval (204), the viewer's adjusted predicted visible luminance range (e.g., as represented by an adjusted predicted maximum visible luminance 212-1 and an adjusted predicted minimum visible luminance 212-2, etc.) for the output video/image content is lower than the viewer's predicted visible luminance range (e.g., as represented by the predicted maximum visible luminance (210-1) and the predicted minimum visible luminance (210-2), etc.) in the second time interval (204), and closer than the viewer's predicted visible luminance range (e.g., as represented by the predicted maximum visible luminance (210-1) and the predicted minimum visible luminance (210-2), etc.) in the first time interval (202).

As a result of luminance level change mitigation operations under techniques as described herein, the excessive change (206) of FIG. 2A in the viewer's (predicted) light adaptive level/state in the input video/image content is reduced to the moderated change (222) of FIG. 2B in the viewer's (predicted) light adaptive level/state in the output video/image content. In some embodiments, the excessive change (206) would exceed the high luminance level change threshold, but the moderated change (222) may be made to not exceed the high luminance level change threshold (e.g., even with a specific preconfigured or dynamically determined safety margin in some embodiments, etc.). In some embodiments, the excessive change (206) would exceed the viewer's predicted visible luminance range (e.g., as represented by the predicted maximum visible luminance (210-1) and the predicted minimum visible luminance (210-2), etc.), but the moderated change (222) may be made to not exceed the viewer's adjusted predicted visible luminance range (e.g., as represented by the adjusted predicted maximum visible luminance (212-1) and the adjusted predicted minimum visible luminance (212-2), etc.).

In some embodiments, as illustrated in FIG. 2B, in the second time interval (204), the viewer's light adaptive level/state (208) for the output video/image content can be adjusted to relatively gradually (e.g., relatively smoothly, etc.) reach at the same fourth light adaptive level/state (230) at the end of the second time interval (204) as in the case of the input video/image content as illustrated in FIG. 2A.

For the purpose of illustration only, it has been described that luminance level adjustment/mapping may be implemented or effectuated in a later time interval such as the second time interval (204) as illustrated in FIG. 2B. It should be noted that, in various embodiments, luminance level adjustment/mapping as described herein may be implemented or effectuated in an earlier time interval such as the first time interval (e.g., 202 of FIG. 2B, etc.), or both the earlier and later time interval such as both the first time interval (e.g., 202 of FIG. 2B, etc.) and the second time interval (e.g., 204 of FIG. 2B, etc.).

4. Light Level Adaptation

Figure 3:
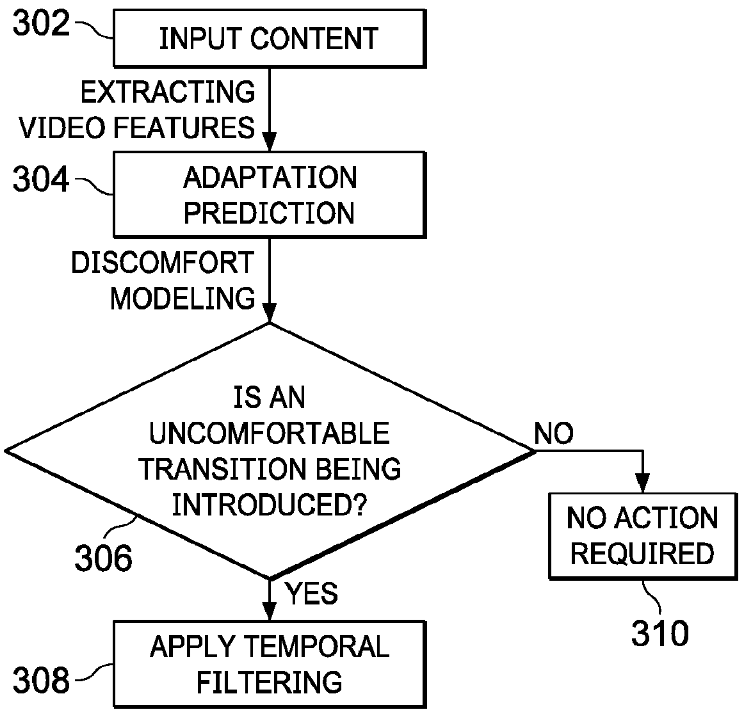
FIG. 3 illustrates an example discomfort reduction method.

FIG. 3 illustrates an example (e.g., automatic, programmatic, with no or little user input/interaction, with user input/interaction, etc.) discomfort reduction method based on predictive modeling from video features determined from input video/image content. In some example embodiments, one or more computing devices or components such as one or both of a media content production system (e.g., 100 of FIG. 1A, etc.) and a media content consumption system (e.g., 150 of FIG. 1B, etc.), etc., may perform this process flow. In some embodiments, one or more computing devices or components may perform this process flow. The method of FIG. 3 may be used to perform a mapping from input video/image content to adjusted/mapped video/image content to reduce discomfort due to a cut or transition in video/image rendering. The luminance range of the adapted/mapped video/image content can be made to slowly return to the original level while maintaining comfortable viewing conditions as illustrated in FIG. 2B.

In block 302, the input video/image content is received. Video features such as average luminance level (and/or maximum and minimum luminance levels), regions of interest, face presence or absence, movement presence or absence, etc., may be extracted from the input video/image content.

In block 304, adaptation prediction is performed with respect to the input video/image content or the video features extracted thereof. For example, a viewer's light adaptive levels/states may be determined over time using the video features extracted from the input video/image content as input to a HVS light adaptive state model. Adaptation times to luminance level changes detected in the input video/image content may be estimated or determined. The viewer's light adaptive levels/states and/or the video features extracted from the input video/image content may be used to perform discomfort modeling to identify any excessive changes in luminance that are likely to induce discomfort in the viewer.

In block 306, it is determined whether an uncomfortable transition (or an excessive change in luminance) is being introduced in any specific portion of the input video/image content if the specific portion of the input video/image is rendered to the viewer without luminance level adaptation.

If it is determined that an uncomfortable transition (or an excessive change in luminance) is being introduced in a specific portion of the input video/image content, in block 308, (e.g., automatic, programmatic, with no or little user input/interaction, with user input/interaction, etc.) temporal filtering is applied to the specific portion of the input video/image content to reduce to remove the excessive change in luminance. Additionally, optionally or alternatively, temporally consistent tone mapping (luminance level mapping) may be performed on the specific portion of the input video/image content (or an intermediate version thereof). For the display-side implementation, the temporal filtering can effectively be achieved by changing the display parameters as used in the display mapping algorithm, as described previously.

On the other hand, if it is determined that an uncomfortable transition (or an excessive change in luminance) is not being introduced in a specific portion of the input video/image content, in block 310, no (e.g., automatic, programmatic, with no or little user input/interaction, with user input/interaction, etc.) temporal filtering is applied to the specific portion of the input video/image content to reduce to remove changes in luminance. Additionally, optionally or alternatively, temporally consistent tone mapping (luminance level mapping) may or may not be performed on the specific portion of the input video/image content (or an intermediate version thereof).

5. Example Process Flows

Figure 4A:
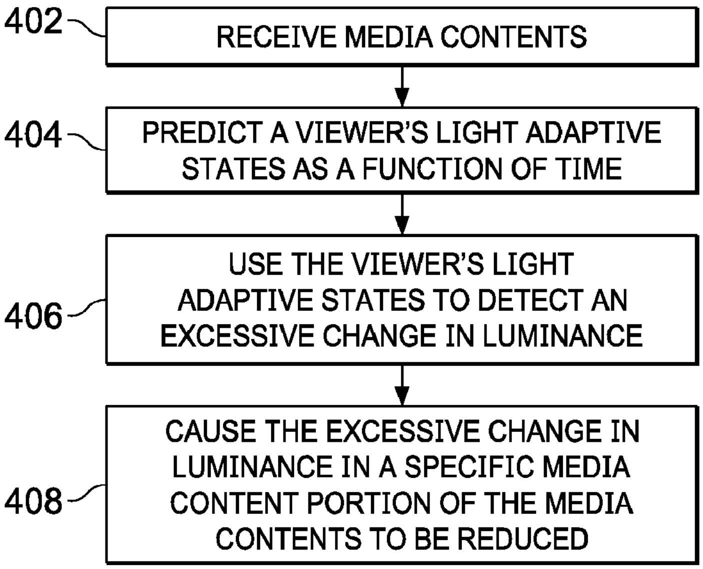
FIG. 4A through FIG. 4D illustrate example process flows.

FIG. 4A illustrates an example process flow according to an example embodiment of the present invention. In some example embodiments, one or more computing devices or components may perform this process flow. In block 402, a media content production system (e.g., a video/image content production system 100 of FIG. 1A, etc.) receives one or more media contents.

In block 404, the media content production system predicts a viewer's light adaptive states as a function of time as if the viewer is watching display mapped images derived from the one or more media contents.

In block 406, the media content production system uses the viewer's light adaptive states to detect an excessive change in luminance in a specific media content portion of the one or more media contents.

In block 408, the media content production system causes the excessive change in luminance in the specific media content portion of the one or more media contents to be reduced while the viewer is watching one or more corresponding display mapped images derived from the specific media content portion of the one or more media contents.

In an embodiment, the excessive change in luminance represents an average luminance level change in the viewer's vision field beyond a visible light level range to which the viewer is predicted to be adapted at a time point at which the one or more corresponding display mapped images are to be rendered.

In an embodiment, the media content production system is further configured to perform: apply temporal filtering to the specific media content portion of the one or more media contents to reduce the excessive change in luminance in a specific adjusted media content portion of one or more adjusted media contents generated from the specific media content portion of the one or more media contents, the one or more adjusted media contents being respectively generated from the one or more media contents; providing the specific adjusted media content portion of the one or more adjusted media contents to a downstream media content consumption system operated by the viewer.

In an embodiment, the temporal filtering is applied within a time interval whose length is set based on whether the excessive change is from dark to bright or from bright to dark.

In an embodiment, the media content production system is further configured to perform: generating a specific image metadata portion to identify the excessive change in luminance in the specific media content portion of one or more media contents; providing the specific image metadata portion of the image metadata with the specific media content portion of one or more media contents to a downstream media content consumption system operated by the viewer.

In an embodiment, the excessive change in luminance is identified using one or more luminance change thresholds; the one or more luminance change thresholds are set with threshold determination factors including one or more of: image metadata received with the one or more media contents, luminance level analyses performed on pixel values of the one or more media contents, view direction data, display capabilities of one or more target display devices, ambient light levels with which one or more target display devices operate, etc.

In an embodiment, the excessive change in luminance is identified for a first target display device but not for a second target display device; the first target device is different from the second target display device in terms of one or more of: display screen sizes, peak luminance levels, luminance dynamic ranges, ambient light levels, etc.

In an embodiment, the media content production system is further configured to perform: generating two or more different versions of one or more output media contents from the one or more media contents for two or more different media content rendering environments, each version in the two or more different versions of the one or more output media contents corresponding to a respective media content rendering environment in the two or more different media content rendering environments, and the two or more different media content rendering environments differing from one another in at least one of: display capabilities of target display devices, screen sizes of target display devices, ambient light levels with which target display devices operate, etc.

In an embodiment, the two or more different versions of the one or more output media contents include at least one of: a high dynamic range version, a standard dynamic range version, a cinema version, a mobile device version, and so forth.

In an embodiment, the media content production system is further configured to perform: displaying one or more portions of the viewer's light adaptive states over time to a user.

In an embodiment, the media content production system is further configured to perform: displaying one or more scene cut quality indications for one or more portions of the viewer's light adaptive states, the one or more scene cut quality indications indicating whether a scene cut in each of the one or more portions is to introduce a predicted excessive change in luminance.

In an embodiment, the media content production system is further configured to perform: displaying one or more scene cut quality indications for one or more portions of the viewer's light adaptive states, wherein the one or more scene cut quality indications indicate whether a scene cut in each of the one or more portions needs luminance grading to be performed at or adjacent to the scene cut.

In an embodiment, the viewer's light adaptive states are determined in reference to the viewer's view directions as indicated in view direction data received from the viewer's media content consumption device.

In an embodiment, the one or more media contents include one or more of: video images, images in an image collection, slides in a slide presentation, immersive images, panorama images, augmented reality images, virtual reality images, remote presence images, and so forth.

Figure 4B:
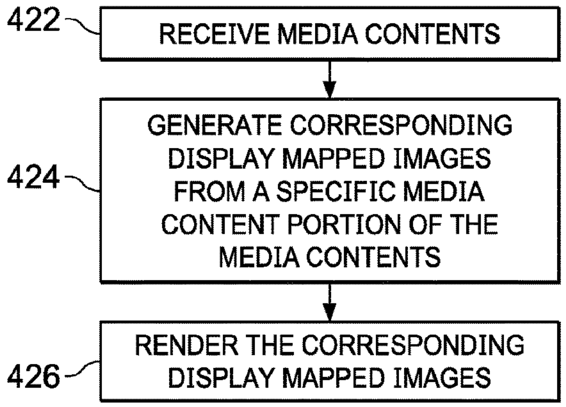

FIG. 4B illustrates an example process flow according to an example embodiment of the present invention. In some example embodiments, one or more computing devices or components may perform this process flow. In block 422, a media content consumption system (e.g., a video/image content consumption system 150 of FIG. 1B, etc.) receives one or more media contents, a specific media content portion of the one or more media contents having been adapted from a specific source media content portion of one or more source media contents by an upstream device to reduce an excessive change in luminance in the specific source media content portion of the one or more source media contents.

The upstream device predicted a viewer's light adaptive states as a function of time as if the viewer is watching display mapped images derived from the one or more source media contents. The upstream device used the viewer's light adaptive states to detect the excessive change in luminance in the specific source media content portion of the one or more source media contents.

In block 424, the media content consumption system generates one or more corresponding display mapped images from the specific media content portion of the one or more media contents.

In block 426, a media content consumption system renders the one or more corresponding display mapped images.

Figure 4C:
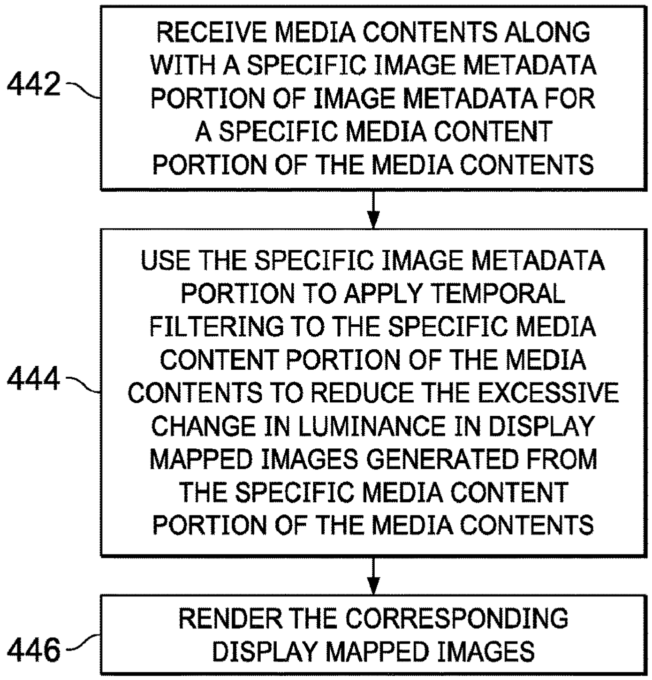

FIG. 4C illustrates an example process flow according to an example embodiment of the present invention. In some example embodiments, one or more computing devices or components may perform this process flow. In block 442, a media content consumption system (e.g., a video/image content consumption system 150 of FIG. 1B, etc.) receives one or more media contents along with a specific image metadata portion of image metadata for a specific media content portion of the one or more media contents.

The upstream device predicted a viewer's light adaptive states as a function of time as if the viewer is watching display mapped images derived from the one or more media contents. The upstream device used the viewer's light adaptive states to detect an excessive change in luminance in the specific media content portion of the one or more media contents. The upstream device identified, in the specific image metadata portion, the excessive change in luminance in the specific media content portion of the one or more media contents.

In block 444, the media content consumption system uses the specific image metadata portion to apply temporal filtering (either directly or via changing of display parameters as used in display mapping for other purposes) to the specific media content portion of the one or more media contents to reduce the excessive change in luminance in one or more display mapped images generated from the specific media content portion of the one or more media contents.

In block 446, the media content consumption system renders the one or more corresponding display mapped images.

Figure 4D:
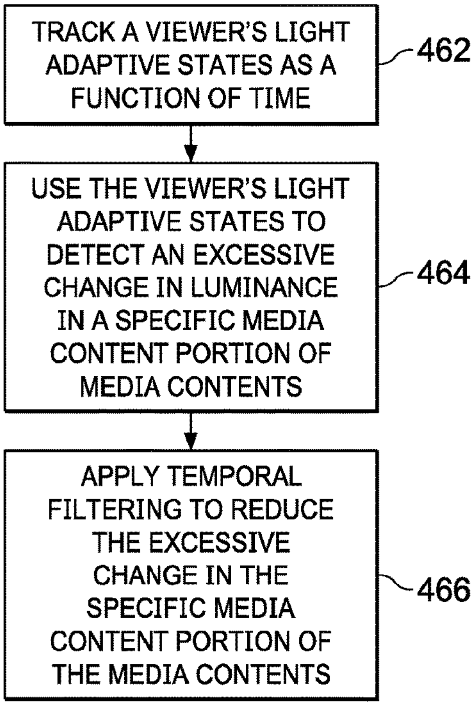

FIG. 4D illustrates an example process flow according to an example embodiment of the present invention. In some example embodiments, one or more computing devices or components may perform this process flow. In block 462, a media content consumption system (e.g., a video/image content consumption system 150 of FIG. 1B, etc.) tracks a viewer's light adaptive states as a function of time while the viewer is watching display mapped images derived from one or more media contents.

In block 464, the media content consumption system uses the viewer's light adaptive states to detect an excessive change in luminance in a specific media content portion of the one or more media contents.

In block 466, the media content consumption system applies temporal filtering to reduce the excessive change in the specific media content portion of the one or more media contents to derive one or more corresponding display mapped images in the display mapped images.

In an embodiment, the excessive change in luminance is caused by one of: a channel change, a menu loading, a graphics loading, a scene cut, an image transition in browsing an image collection, a slide presentation transition in a slide presentation, and so forth.

In an embodiment, the excessive change is automatically detected by the viewer's media content consumption system at runtime.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of the present invention.

EEE1. A method for media content production, comprising:

receiving one or more media contents;

predicting a viewer's light adaptive states as a function of time as if the viewer is watching display mapped images derived from the one or more media contents;

using the viewer's light adaptive states to detect an excessive change in luminance in a specific media content portion of the one or more media contents;

causing the excessive change in luminance in the specific media content portion of the one or more media contents to be reduced while the viewer is watching one or more corresponding display mapped images derived from the specific media content portion of the one or more media contents.

EEE2. The method of EEE1, wherein the excessive change in luminance represents an average luminance level change in the viewer's vision field beyond a visible light level range to which the viewer is predicted to be adapted at a time point at which the one or more corresponding display mapped images are to be rendered.

EEE3. The method of EEE1, further comprising:

applying temporal filtering to the specific media content portion of the one or more media contents to reduce the excessive change in luminance in a specific adjusted media content portion of one or more adjusted media contents generated from the specific media content portion of the one or more media contents, wherein the one or more adjusted media contents are respectively generated from the one or more media contents;

providing the specific adjusted media content portion of the one or more adjusted media contents to a downstream media content consumption system operated by the viewer.

EEE4. The method of EEE3, wherein the temporal filtering is applied within a time interval whose length is set based on whether the excessive change is from dark to bright or from bright to dark.

EEE5. The method of EEE1, further comprising:
- generating a specific image metadata portion to identify the excessive change in luminance in the specific media content portion of one or more media contents;
- providing the specific image metadata portion of the image metadata with the specific media content portion of one or more media contents to a downstream media content consumption system operated by the viewer.

EEE6. The method of EEE1, wherein the excessive change in luminance is identified using one or more luminance change thresholds, wherein the one or more luminance change thresholds are set with threshold determination factors including one or more of: image metadata received with the one or more media contents, luminance level analyses performed on pixel values of the one or more media contents, view direction data, display capabilities of one or more target display devices, or ambient light levels with which one or more target display devices operate.

EEE7. The method of EEE1, wherein the excessive change in luminance is identified for a first target display device but not for a second target display device, and wherein the first target device is different from the second target display device in terms of one or more of: display screen sizes, peak luminance levels, luminance dynamic ranges, or ambient light levels.

EEE8. The method of EEE1, further comprising: generating two or more different versions of one or more output media contents from the one or more media contents for two or more different media content rendering environments, wherein each version in the two or more different versions of the one or more output media contents corresponds to a respective media content rendering environment in the two or more different media content rendering environments, and wherein the two or more different media content rendering environments differ from one another in at least one of: display capabilities of target display devices, screen sizes of target display devices, or ambient light levels with which target display devices operate.

EEE9. The method of EEE8, wherein the two or more different versions of the one or more output media contents include at least one of: a high dynamic range version, a standard dynamic range version, a cinema version, or a mobile device version.

EEE10. The method of EEE1, further comprising: displaying one or more portions of the viewer's light adaptive states over time to a user.

EEE11. The method of EEE10, further comprising: displaying one or more scene cut quality indications for one or more portions of the viewer's light adaptive states, wherein the one or more scene cut quality indications indicate whether a scene cut in each of the one or more portions is to introduce a predicted excessive change in luminance.

EEE12. The method of EEE10, further comprising: displaying one or more scene cut quality indications for one or more portions of the viewer's light adaptive states, wherein the one or more scene cut quality indications indicate whether a scene cut in each of the one or more portions needs luminance grading to be performed at or adjacent to the scene cut.

EEE13. The method of EEE1, wherein the viewer's light adaptive states are determined in reference to the viewer's view directions as indicated in view direction data received from the viewer's media content consumption device.

EEE14. The method of EEE1, wherein the one or more media contents include one or more of: video images, images in an image collection, slides in a slide presentation, immersive images, panorama images, augmented reality images, virtual reality images, or remote presence images.

EEE15. A method for media content consumption, comprising:
- receiving one or more media contents, a specific media content portion of the one or more media contents having been adapted from a specific source media content portion of one or more source media contents by an upstream device to reduce an excessive change in luminance in the specific source media content portion of the one or more source media contents;
- wherein the upstream device predicted a viewer's light adaptive states as a function of time as if the viewer is watching display mapped images derived from the one or more source media contents;
- wherein the upstream device used the viewer's light adaptive states to detect the excessive change in luminance in the specific source media content portion of the one or more source media contents;
- generating one or more corresponding display mapped images from the specific media content portion of the one or more media contents;
- rendering the one or more corresponding display mapped images.

EEE16. A method for media content consumption, comprising:
- receiving one or more media contents along with a specific image metadata portion of image metadata for a specific media content portion of the one or more media contents;
- wherein the upstream device predicted a viewer's light adaptive states as a function of time as if the viewer is watching display mapped images derived from the one or more media contents;
- wherein the upstream device used the viewer's light adaptive states to detect an excessive change in luminance in the specific media content portion of the one or more media contents;
- wherein the upstream device identified, in the specific image metadata portion, the excessive change in luminance in the specific media content portion of the one or more media contents;
- using the specific image metadata portion to apply temporal filtering to the specific media content portion of the one or more media contents to reduce the excessive change in luminance in one or more display mapped images generated from the specific media content portion of the one or more media contents;
- rendering the one or more corresponding display mapped images.

EEE17. A method for media content consumption, comprising:
- tracking a viewer's light adaptive states as a function of time while the viewer is watching display mapped images derived from one or more media contents;
- using the viewer's light adaptive states to detect an excessive change in luminance in a specific media content portion of the one or more media contents;
- applying temporal filtering to reduce the excessive change in the specific media content portion of the one or more media contents to derive one or more corresponding display mapped images in the display mapped images.

EEE18. The method of EEE17, wherein the excessive change in luminance is caused by one of: a channel change, a menu loading, a graphics loading, a scene cut, an image transition in browsing an image collection, or a slide presentation transition in a slide presentation.

EEE19. The method of EEE17, wherein the excessive change is automatically detected by the viewer's media content consumption system at runtime.

What is claimed is:

1. A method comprising:

applying a model of human visual adaptation to one or more media contents to be rendered over one or more time intervals on a target image display to predict a viewer's one or more predicted light adaptive ranges between maximum and minimum luminance levels visible to the viewer at one or more time points over the one or more time intervals;

using the viewer's one or more light adaptive ranges to detect an excessive change in luminance in a specific media content portion of the one or more media contents;

causing the excessive change in luminance in the specific media content portion of the one or more media contents to be reduced while the viewer is watching one or more corresponding display mapped images derived from the specific media content portion of the one or more media contents.

2. The method of claim 1, wherein the excessive change in luminance represents an average luminance level change in the viewer's vision field beyond a visible light level range to which the viewer is predicted to be adapted at a time point at which the one or more corresponding display mapped images are to be rendered.

3. The method of claim 1, further comprising:

applying temporal filtering to the specific media content portion of the one or more media contents to reduce the excessive change in luminance in a specific adjusted media content portion of one or more adjusted media contents generated from the specific media content portion of the one or more media contents, wherein the one or more adjusted media contents are respectively generated from the one or more media contents;

providing the specific adjusted media content portion of the one or more adjusted media contents to be rendered on an image display.

4. The method of claim 3, wherein the temporal filtering is achieved by changing display parameters which are used in a display mapping algorithm.

5. The method of claim 3, wherein the temporal filtering is applied within a time interval whose length is set based on whether the excessive change is from dark to bright or from bright to dark.

6. The method of claim 1, further comprising:

generating a specific image metadata portion to identify the excessive change in luminance in the specific media content portion of one or more media contents;

providing the specific image metadata portion of the image metadata with the specific media content portion of one or more media contents to a downstream media content consumption system.

7. The method of claim 1, wherein the excessive change in luminance is identified using one or more luminance change thresholds, wherein the one or more luminance change thresholds are set with threshold determination factors including one or more of: image metadata received with the one or more media contents, luminance level analyses performed on pixel values of the one or more media contents, view direction data, display capabilities of one or more target display devices, or ambient light levels with which one or more target display devices operate.

8. The method of claim 1, wherein the excessive change in luminance is identified for the target display device but not for a second target display device, and wherein the target device is different from the second target display device in terms of one or more of: display screen sizes, peak luminance levels, luminance dynamic ranges, or ambient light levels.

9. The method of claim 1, further comprising: generating two or more different versions of one or more output media contents from the one or more media contents for two or more different media content rendering environments, wherein each version in the two or more different versions of the one or more output media contents corresponds to a respective media content rendering environment in the two or more different media content rendering environments, and wherein the two or more different media content rendering environments differ from one another in at least one of: display capabilities of target display devices, screen sizes of target display devices, or ambient light levels with which target display devices operate.

10. The method of claim 9, wherein the two or more different versions of the one or more output media contents include at least one of: a high dynamic range version, a standard dynamic range version, a cinema version, or a mobile device version.

11. The method of claim 10, wherein the excessive change in luminance is generated by upconversion of the standard dynamic version to the high dynamic range version in a display device.

12. The method of claim 1, wherein the viewer's one or more light adaptive ranges are determined in reference to the viewer's one or more view directions as indicated in view direction data received from a media content consumption device.

13. The method of claim 1, wherein the one or more media contents include one or more of: video images, images in an image collection, slides in a slide presentation, immersive images, panorama images, augmented reality images, virtual reality images, or remote presence images.

14. A computing device comprising one or more processors and one or more storage media, storing a set of instructions, which when executed by one or more processors cause performance of the method recited in claim 1.

15. A method comprising:

applying a model of human visual adaptation to one or more media contents to be rendered over one or more time intervals on a target image display to predict a viewer's one or more predicted light adaptive ranges between maximum and minimum luminance levels visible to the viewer at one or more time points over the one or more time intervals;

using the viewer's one or more predicted light adaptive ranges to detect an excessive change in luminance in a specific source media content portion of the one or more source media contents;

generating one or more corresponding display mapped images from the specific source media content portion of the one or more source media contents;

rendering the one or more corresponding display mapped images on an image display.

16. A computing device comprising one or more processors and one or more storage media, storing a set of instructions, which when executed by one or more processors cause performance of the method recited in claim 15.

17. A method comprising:

applying a model of human visual adaptation to one or more media contents to be rendered over one or more time intervals on a target image display to predict a viewer's one or more predicted light adaptive ranges between maximum and minimum luminance levels visible to the viewer at one or more time points over the one or more time intervals;

using the viewer's one or more predicted light adaptive ranges to detect an excessive change in luminance in a specific media content portion of the one or more media contents;

identifying, in a specific image metadata portion, the excessive change in luminance in the specific media content portion of the one or more media contents;

using the specific image metadata portion to apply temporal filtering to the specific media content portion of the one or more media contents to reduce the excessive change in luminance in one or more display mapped images generated from the specific media content portion of the one or more media contents;

rendering the one or more corresponding display mapped images on an image display.

18. A computing device comprising one or more processors and one or more storage media, storing a set of instructions, which when executed by one or more processors cause performance of the method recited in claim 17.

19. A method comprising:

tracking a viewer's light adaptive ranges at one or more time points while the viewer is watching display mapped images derived from one or more media contents;

wherein each of the viewer's light adaptive range as tracked includes a respective predicted range between maximum and minimum luminance levels visible to the viewer at each of the one or more time points;

using the viewer's light adaptive ranges to detect an excessive change in luminance in a specific media content portion of the one or more media contents;

applying temporal filtering to reduce the excessive change in the specific media content portion of the one or more media contents to derive one or more corresponding display mapped images to be rendered on an image display.

20. A computing device comprising one or more processors and one or more storage media, storing a set of instructions, which when executed by one or more processors cause performance of the method recited in claim 19.

* * * * *